TIME CONTROLLED SIGNAL DISCRIMINATOR CIRCUIT

Filed Sept. 30, 1954

INVENTOR.
OLIN L. MacSORLEY
BY P. E. Henninger
ATTORNEY

United States Patent Office 2,880,331

Patented Mar. 31, 1959

2,880,331

TIME CONTROLLED SIGNAL DISCRIMINATOR CIRCUIT

Olin L. MacSorley, Poughkeepsie, N.Y., assignor to International Business Machines Corporation, New York, N.Y., a corporation of New York Application September 30, 1954, Serial No. 459,385

4 Claims. (Cl. 307—88.5)

This invention relates to a circuit for discriminating between electrical signal pulses transmitted over a single line but differing in significance or in function according to a pre-established time code.

It has been common in many control and communications fields to send signals over a single line from one or more sources to a plurality of different destinations, for example, to perform different control functions. In one type of system for sending such signals over a single line, the signal pulses intended for different destinations are distinguished by a time code. That is, the signals are transmitted in accordance with a repeated cycle, each cycle being divided into a plurality of intervals, the signals for one particular destination always being sent at the same interval within the repeated cycle. A multiplex telegraph system is an example of such an arrangement.

It has been the practice in some systems to use relay circuits for discrimination between signals according to a time coded cycle. In high speed computers, it has more recently become the practice to use logical circuits, such as diode And circuits, to obtain the required signal discrimination. The diodes are comparatively inexpensive, but their power requirements from the driving circuits are considerably greater than those of transistor circuits for equivalent performance. It is therefore desirable to provide a transistor circuit which will perform this signal discrimination function. However, since transistors are considerably more expensive than diodes, it is desirable to keep the number of transistors in the circuit to a minimum.

An object of the invention is to provide an improved and simplified circuit for signal discrimination employing transistors.

Another object is to provide a signal discriminator circuit including an input stage for receiving incoming signals, and a plurality of parallel output stages, all driven by the single input stage, and each having a second input, the second inputs being respectively connected to time coded input signals which correspond to different specific intervals of the time code cycle.

Another object of the invention is to provide a circuit of the type described including an emitter follower circuit for the signal input stage.

Another object is to provide a circuit of the type described including emitter follower circuits for the signal output stages.

Another object is to provide a circuit of the type described including inverter circuits for the signal output stages.

The foregoing objects of the invention are attained, in the circuits described herein, by providing, for the receipt of incoming signals, an emitter follower input stage of the type described in the copending application of George D. Bruce, Robert A. Henle and James L. Walsh, Serial No. 459,382, filed September 30, 1954.

The output of the emitter follower stage is conveyed to one input of each of a plurality of And circuits. The other inputs of the several And circuits receive differently timed impulses and therefore distinguish between signal impulses received at different times of the code cycle.

In one circuit described herein, the several And circuits contain emitter follower circuits, similar in many respects to the input circuit. In another circuit described herein, the several And circuits contain inverter circuits of the general type described in the copending application of George D. Bruce and Robert A. Henle, Serial No. 459,322, filed September 30, 1954.

Other objects and advantages of the invention will become apparent from a consideration of the following specification and claims, taken together with the accompanying drawings.

FIGURE 1

Figures 2, 3:
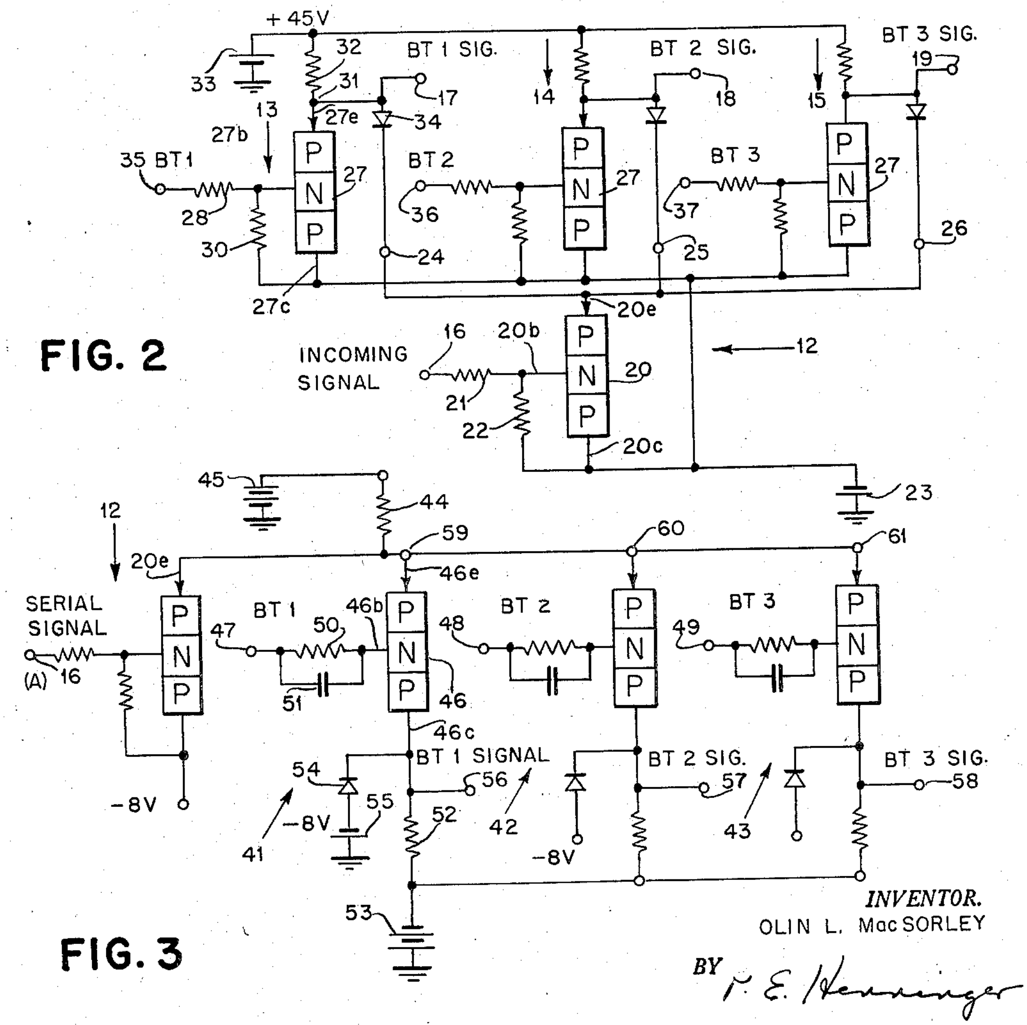
Fig. 2 is an electrical wiring diagram of one form of discriminator circuit embodying the invention.
Fig. 3 is an electrical wiring diagram of a modified form of discriminator circuit embodying the invention.

The line 1 in this figure illustrates a typical incoming signal as it may be received by the circuits of Figs. 2 and 3, this incoming signal consisting of a series of signal pulses of varying duration. The lines 2, 3 and 4 illustrate how, in the arrangement selected by way of example for purposes of illustration, a series of repeated time cycles, each indicated by the reference numeral 5, is subdivided into three intervals, identified respectively by the reference numerals 6, 7 and 8. It will be recognized that a complete cycle may be as long as desired, and that it may be subdivided into as many intervals as desired.

The circuits of Figs. 2 and 3 analyze the incoming signal indicated by the line 1, and separate it into three separate signals illustrated by the lines 9, 10 and 11, and hereinafter identified as the BT1, BT2, or BT3 signals, the abbreviation BT standing for bit time.

The BT1 signal may be On only during the intervals numbered 6, the BT2 signal may be On only during the interval numbered 7 and the BT3 signal may be On only during the interval numbered 8.

Figure 1:
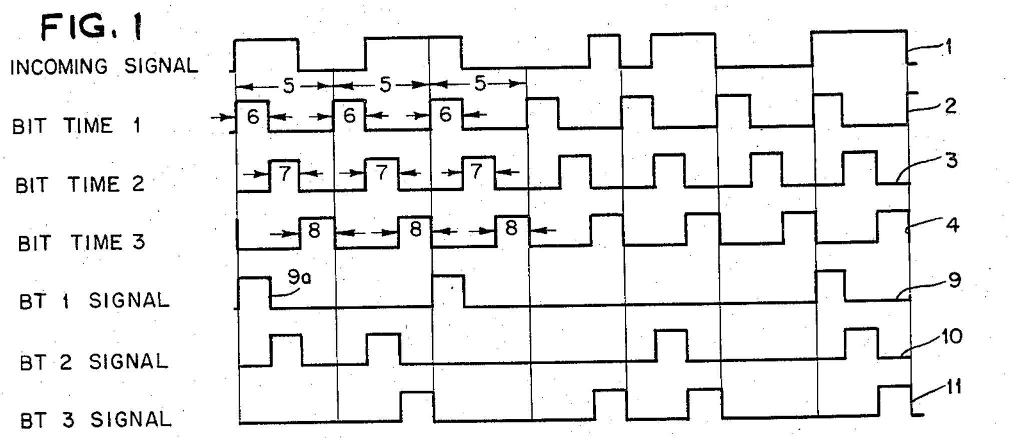
Fig. 1 is a graphical illustration of the signals passing through the circuits shown in Figs. 2 and 3, at various points in those circuits.

Considering the first complete time cycle 5, appearing at the left of Fig. 1, it may be seen that the BT1 signal is On during the interval 6, since the incoming signal is On during that interval. During the interval 7, the incoming signal remains On so that BT2 signal is On. During the interval 8, the incoming signal is Off, so that BT3 signal remains Off throughout the cycle. The incoming signals 1 throughout the succeeding cycles 5 in Fig. 1 and the separated signals in the lines 9, 10 and 11 may be analyzed in a similar manner.

FIGURE 2

The circuit of Fig. 2 is adapted to receive the incoming signals shown in the line 1 of Fig. 1 and to analyze them, producing at three separate output terminals signals corresponding to the BT1, BT2, and BT3 signals of Fig. 1.

The circuit of Fig. 2 includes an input emitter follower circuit generally indicated by the reference numeral 12, and three output circuits, which are also emitter follower circuits, respectively generally indicated by the reference numerals 13, 14 and 15. The incoming signals are received at an input terminal 16 and the BT1, BT2 and BT3 signals are respectively transmitted from the circuit of Fig. 2 at output terminals 17, 18 and 19.

The emitter follower circuit 12 includes a PNP transistor 20, having an emitter electrode **20*e*, a base electrode 20*b*, and a collector electrode 20*c*. Input terminal 16** is connected to base 20b through a resistor 21. A resistor 22 connects base 20b with collector 20c. Collector 20c is also connected to a biasing battery 23.

Emitter 20e is connected to input terminals 24, 25 and 26, respectively, of the And circuits 13, 14 and 15. These three And circuits are similar in all respects. The circuit elements in each of them have been given the same reference numerals as the corresponding circuit elements in the others. Only one of the And circuits will be described in detail.

The And circuit 13 comprises a PNP junction transistor 27 having an emitter electrode 27e, a base electrode 27b, and a collector electrode 27c. Base electrode 27b is connected through a resistor 28 to a timing signal input terminal 35. A resistor 30 connects base 27b with collector 27c. Emitter 27e is connected to a junction 31 and thence through a resistor 32 to a battery 33.

Input terminal 24 is connected through a diode 34 to junction 31, which is in turn directly connected to output terminal 17.

The timing signal input terminals for the three And circuits 13, 14 and 15 are numbered respectively 35, 36 and 37. These timing signal input terminals are connected respectively to signal generators which produce input pulses at the different timed intervals of the code cycle, as illustrated for example by the lines 2, 3 and 4 in Fig. 1. The signal generator for producing these time coded signals may, for example, be three successive stages of a ring circuit, for example, such as that shown in the copending application of T. E. Wohr, Serial No. 459,471 filed September 30, 1954. While it is true that the Wohr ring circuit is adapted only for cycles having even numbers of intervals, it will be recognized that the present cycle of three intervals has been selected only for purposes of illustration. Furthermore, it will be recognized that other ring circuits not limited to even numbers of intervals are well known in the art.

OPERATION

Considering first the input stage, i.e., the emitter follower circuit 12, note that the emitter 20e is positively biased by the battery 33 through the several resistors 32 and diodes 34. The emitter-to-base impedance is very small and the emitter potential follows closely variations in the base potential. The circuit illustrated is arranged for operation in response to incoming signals having a background or "no-signal" value of −8 volts and a "signal" value of 0 volts.

When an incoming signal is received at input terminal 16, the emitter 20e repeats the changes in potential of the incoming signal, which repeated changes in potential are transmitted to the input terminals 24, 25 and 26 of the And circuits 13, 14 and 15.

Considering the And circuit 13, emitter 27e is biased positively by its connection to the positive terminal of battery 33 through resistor 32. Its emitter 27e therefore tends to follow the variations in potential at the input terminal 35, in the same manner that emitter 20e follows the variations in potential at input terminal 16.

Under no-signal conditions, the potential of input terminal 16 is −8 and the potential of emitter 20e is therefore substantially also −8 volts. The input terminal 35 is likewise at −8 volts and emitter 27e is therefore also at substantially −8 volts. There is substantially no potential drop across the diode 34 and output terminal 17 is at its no-signal potential of −8 volts.

When an input is received at input terminal 35 only, the potential of that terminal swings to 0 volts. This tends to swing the emitter of 27e also to 0 volts, but the emitter is clamped at −8 volts by the effect of the potential of emitter 20e, which is then transmitted through diode 34 in its forward direction. Emitter 27e therefore remains at −8 volts while the base 27b goes to 0 volts so that transistor 27 cuts off.

When a signal is received at input terminal 16, it is transmitted by the input stage 12 to input terminal 24, changing the potential of that terminal from −8 volts to 0 volts. If there is then no signal at input terminal 35, the emitter 27e remains at its normal potential, which is lower than that of input terminal 24, and the potential at input terminal 24 is blocked by the diode 34 from passing through to the output terminal 17.

If, however, positive signals are received at input terminals 16 and 35 simultaneously, the emitters 20e and 27e both tend to go to a potential of 0 volts. The junction 31 and output terminal 17 follow these changes in potential, since they are directly connected to emitter 27e and to emitter 20e through the diode 34 in its low impedance direction.

Summarizing, it may be seen that the And circuit 13 will produce a signal at its output terminal 17 only when signals are simultaneously received at the input terminals 16 and 35. In the first cycle 5 appearing at the left-hand side of Fig. 1, the input terminal 16 receives a positive signal during the first two intervals 6 and 7, but input terminal 35 receives a signal only during interval 6. Consequently, an output signal is produced in terminal 17 only during the first interval 6, as indicated at 9a in Fig. 1. Lines 9, 10 and 11 of Fig. 1 illustrate respectively the signals appearing at output terminals 17, 18 and 19 of Fig. 2, when the incoming signal 1 of Fig. 1 is supplied to input terminal 16, and time signals 2, 3 and 4 of Fig. 1 are supplied to input terminals 35, 36 and 37, respectively.

It should be noted that the load resistors 32 present a load to the emitter follower 12 only when the corresponding inputs to 35, 36 or 37 are at 0 volts. When the circuit is operated in the manner being described, at no time is more than one of these inputs at 0, all the others being at −8 volts. Therefore, although the transistor 20 supplies the power to operate one side of a number of And circuits, it is only required to be able to supply sufficient power to handle one of them.

The purpose of resistors 30 and 22 is to insure a "no signal" output if for any reason the input circuit is disconnected.

FIGURE 3

The circuit of Fig. 3 comprises an input stage 12 which is equivalent in all respects to the input stage 12 of Fig. 2, and has therefore been given the same reference numeral. The circuit elements have also been given the same reference numerals, except that emitter 20e is shown in Fig. 3 as being connected through a resistor 44 to a battery 45. The circuit of Fig. 3 also includes three output stages generally indicated by the reference numerals 41, 42 and 43. The stages 41, 42 and 43, which serve as And circuits, are respectively provided with timing signal input terminals 47, 48 and 49, and with incoming signal input terminals 59, 60 and 61. Each of these output stages has equivalent circuit elements, for which the same reference numerals have been used in all three stages. Only one of the stages 41, 42 and 43 and its operation will be described in detail. As mentioned above, each of these three stages comprises an inverter circuit of the type disclosed and claimed in the copending application of Bruce and Henle, Serial No. 459,322.

The stage 41 comprises a PNP junction transistor 46 having an emitter electrode 46e, a base electrode 46b and a collector electrode 46c. Input terminal 47 is connected through a resistor 50 and a parallel capacitor 51 to the base 46b. Collector 46c is connected through a resistor 52 to a load supply battery 53. A clamping circuit is also provided for collector 46c, comprising a diode 54 and a clamping battery 55 in series. In Fig. 3, the biasing battery for the collector of the input stage and the clamping batteries for the inverter stages 42 and 43 have been omitted and replaced by terminals labeled with the battery potential (−8 v.). Collector electrode 46c is also connected to output terminal 56, which corresponds to output terminals 57 and 58, respectively, in the case of stages 42 and 43.

OPERATION—FIG. 3

The stages 41, 42 and 43 are inverter stages. That is to say, they respond to negative input pulses at their respective input terminals 47, 48 and 49 and produce positive output pulses at their output terminals 56, 57 and 58. For example, in the circuit illustrated, the no-signal condition of the input terminal 47 is 0 volts potential and the signal condition is −8 volts, while the no-signal condition of output terminal 56 is −8 volts and the signal condition is 0 volts.

The operation of the input stage 12 is substantially the same as in the case of Fig. 2, described above. When there is no signal at the input terminal 16, the emitter **20*e* is then at −8 volts. The emitter 46*e* of stage 41 is at the same potential. If there is then no signal at input terminal 47, the base 46*b* is more positive than the emitter 46*e*, and the transistor 46 is Off. Its collector 46*c* is then at the potential established by battery 55 and clamping diode 54**, namely −8 volts.

If under these conditions a signal is received at input terminal 16, it is transmitted to emitter **20*e* and emitter 46*e*. If there continues to be no signal at input terminal 47, there is then no potential difference between the emitter 46*e* and base 46*b*, so the transistor 46** does not turn On, but remains Off.

If a signal is received at input terminal 47 but not at input terminal 16, then the base electrode **46*b* goes to −8 volts and the emitter 46*e* remains at −8 volts. Again there is no potential difference between the emitter and the base, and transistor 46** remains Off.

If a signal is received simultaneously at input terminal 16 and input terminal 47, then the emitter electrode **46*e* goes to 0 volts and the base electrode 46*b* goes to −8 volts. The emitter is then substantially positive with respect to the base, and the transistor turns On, conducting a substantial current through collector 46*c* and resistor 52 and changing the potential of collector 46*c* in a positive sense, thereby producing an output signal at the terminal 56**.

It may therefore be seen that the circuit of Fig. 3 produces output signals at terminal 56 only during those intervals 6 in the cycles 5 of Fig. 1 during which an incoming signal is received at terminal 16. Similarly, signals are produced at output terminals 57 and 58, only during those intervals 7 and 8 respectively, when incoming signals are received at terminal 16.

It is also readily apparent that if slower speed operation is permitted, the battery 53 may be made equal to the low signal level (−8 volts) and the clamp diodes 54 eliminated.

The following table shows by way of example particular values for the potentials of the various batteries and for the impedances of the various resistors and capacitors, in circuits which have been operated successfully. In some cases, these values are also shown in the drawings. These values are set forth by way of example only, and the invention is not limited to them nor to any of them. No values are given for the diodes, which may be considered to have substantially no impedance in their forward direction and substantially infinite impedance in their reverse direction.

*Table I*

| | | |
|---|---|---|
| Resistor **21** | ohms | 560 |
| Resistor **22** | do | 47K |
| Battery **23** | volts | 8 |
| Resistor **28** | ohms | 560 |
| Resistor **30** | do | 47K |
| Resistor **32** | do | 10K |
| Battery **33** | volts | 45 |
| Resistor **44** | ohms | 10K |
| Battery **45** | volts | 45 |
| Resistor **50** | ohms | 27K |
| Capacitor **51** | mmf | 470 |
| Resistor **52** | ohms | 15K |
| Battery **53** | volts | 45 |
| Battery **55** | do | 8 |

While I have shown and described certain preferred embodiments of my invention, other modifications thereof will readily occur to those skilled in the art, and I therefore intend my invention to be limited only by the appended claims.

I claim:

1. An electric circuit for discriminating between received input signal pulses in accordance with the times of receiving said pulses, comprising: a signal input stage including a first transistor having an emitter electrode, a collector electrode and a base electrode, signal input means for transmitting to said base electrode received pulses shifting suddenly between two separated values, a resistor and a source of direct electrical energy connected in series between the emitter electrode and a common junction, said source being poled to bias the emitter-base impedance forwardly so that the emitter follows variations in the base potential, and having sufficient potential to maintain said forward bias when the signal potential is at either of said two values, and a plurality of And circuits, each And circuit comprising a second transistor having an emitter electrode, a collector electrode and a base electrode, means directly and conductively coupling the emitter electrodes of the second transistors to the emitter electrode of the first transistor, signal output terminals connected to the respective collector electrodes of the second transistors, and timing signal input terminals connected to the respective base electrodes of the second transistors, means for transmitting separate sequentially timed signal pulses to the respective timing signal input terminals of the And circuits in sequence; said signal input stage and said transmitting means cooperating to control the current flow through said second transistors so that each And circuit produces a signal at its output terminal when and only when signal pulses are received simultaneously at its timing signal input terminal and at the base electrode of the first transistor.

2. An electric circuit for discriminating between received input signal pulses in accordance with the times of receiving said pulses, comprising: a signal input stage including a first transistor having an emitter electrode, a collector electrode and a base electrode, signal input means for transmitting to said base electrode received pulses shifting suddenly between two separated values, a resistor and a source of direct electrical energy connected in series between the emitter electrode and a common junction, said source being poled to bias the emitter-base impedance forwardly so that the emitter follows variations in the base potential, and having sufficient potential to maintain said forward bias when the signal potential is at either of said two values, biasing means connected between said collector electrode and said common junction and biasing the collector-base impedance reversely, a resistor connected in parallel with the base-collector impedance and effective to maintain a current flow through the emitter-base impedance if said transmitting means is disconnected; and a plurality of And circuits, each And circuit comprising a second transistor having an emitter electrode, a collector electrode and a base electrode, a plurality of timing signal input terminals, each connected to the base electrode of one of the second transistors, means coupling one of the collector and emitter electrodes of each of the second transistors to the emitter electrode of the first transistor, a plurality of signal output terminals, each connected to one of the collector and emitter electrodes of each of the second transistors, means for transmitting separate sequentially timed signal pulses to the respective timing signal input terminals of the And circuits in sequence; said signal input stage, and said transmitting means cooperating to control the current flow through said second transistors so that each And circuit produces a signal at its output terminal when and only when signal pulses are received simultaneously at its timing signal input terminal and at the base electrode of the first transistor.

3. An electric circuit as defined in claim 2, in which said coupling means comprises, for each of said second transistors, a diode connected between the emitter thereof and the emitter of the first transistor, said diode being poled in the same sense as the emitter-base impedances of the transistors; and in which said output terminals are connected directly and conductively to the emitter electrodes of the second transistors.

4. An electric circuit as defined in claim 2, in which said coupling means is direct and conductive and without coupling impedances; and in which said output terminals are connected directly and conductively to the collector electrodes of the second transistors.

References Cited in the file of this patent

UNITED STATES PATENTS

| | | |
|---|---|---|
| 2,535,377 | Titterton | Dec. 26, 1950 |
| 2,572,792 | White | Oct. 23, 1951 |
| 2,577,015 | Johnson | Dec. 4, 1951 |
| 2,585,078 | Barney | Feb. 12, 1952 |
| 2,614,141 | Edson | Oct. 14, 1952 |
| 2,622,212 | Anderson et al. | Dec. 16, 1952 |
| 2,627,039 | MacWilliams | Jan. 27, 1953 |
| 2,644,892 | Gehman | July 7, 1953 |
| 2,745,956 | Baker | May 15, 1956 |
| 2,770,728 | Herzog | Nov. 13, 1956 |
| 2,773,982 | Trousdale | Dec. 11, 1956 |

OTHER REFERENCES

Publication: Proc. I. R. E., November 1952, pages 1490–1493, Patent Office Library.